United States Patent [19]

Choi

[11] Patent Number: 5,057,700
[45] Date of Patent: Oct. 15, 1991

[54] LIGHT CONTROL CIRCUIT FOR CAMCORDER

[75] Inventor: Yong H. Choi, Chungscheongnam, Rep. of Korea

[73] Assignee: Goldstar Co., Ltd., Seoul, Rep. of Korea

[21] Appl. No.: 412,817

[22] Filed: Sep. 27, 1989

[30] Foreign Application Priority Data

Oct. 31, 1988 [KR] Rep. of Korea .......... 14205/1988[U]

[51] Int. Cl.⁵ .......................................... H01H 47/00
[52] U.S. Cl. ..................................... 307/125; 307/141; 307/117
[58] Field of Search ............... 307/112, 116, 125, 126, 307/139, 140, 141, 141.4, 117

[56] References Cited

U.S. PATENT DOCUMENTS

| | | | |
|---|---|---|---|
| 4,267,467 | 5/1981 | Tsukada | 307/246 |
| 4,370,564 | 1/1983 | Matsushita | 307/140 |
| 4,498,019 | 2/1985 | Berger | 307/141.4 |

Primary Examiner—A. D. Pellinen
Assistant Examiner—Jeffrey A. Gaffin
Attorney, Agent, or Firm—Nixon & Vanderhye

[57] ABSTRACT

A light control circuit for a video camcorder, where said video camcorder includes an illumination light. The light control circuit includes a pause switch for enabling the light control circuit. A light on/off control is responsive to the pause switch and controls a light control relay. A record signal delay is responsive to the on/off control and applied a record signal to a microcomputer a predetermined elapsed time after operation of the light on/off control. An illuminance detector is responsive to illuminance surrounding the video camcorder and generates a comparison output signal indicative of the surrounding illuminance. A light control is responsive to the light control relay and controls the illumination light associated with said camcorder.

6 Claims, 3 Drawing Sheets

5,057,700

1

LIGHT CONTROL CIRCUIT FOR CAMCORDER

SUMMARY

Present invention relates to a light control circuit for camcorders, in particular a circuit that, when recording, automatically enables a light connected to the camcorder circuit then places the camcorder in a record mode with delay time to automatically adjust brightness of the light according to the environmental illuminance but, when in pause, puts off the light.

Figure 1:
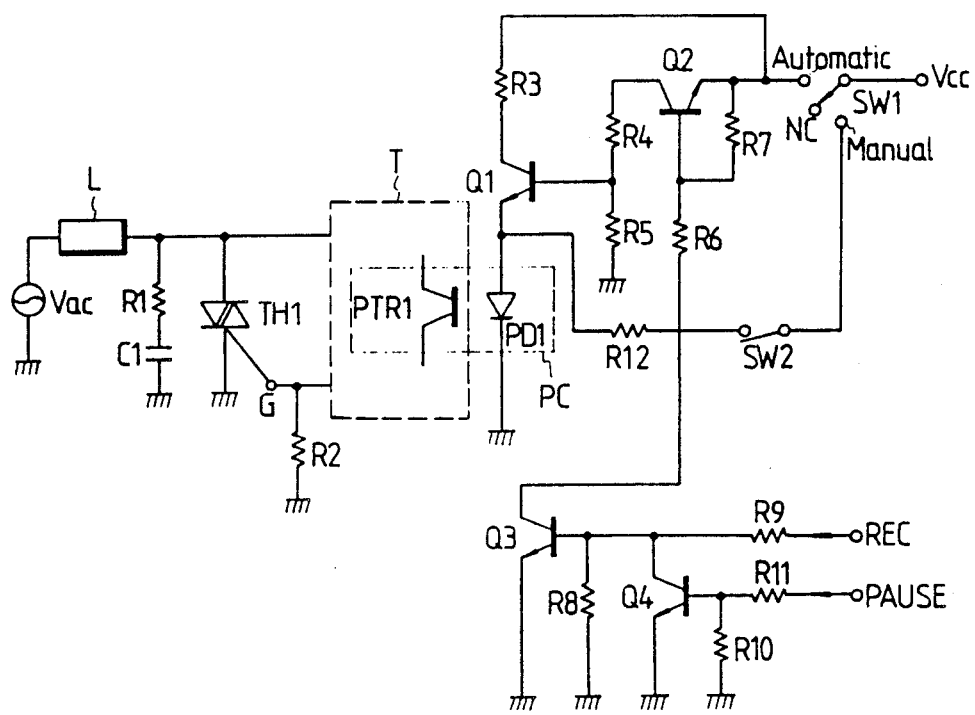
FIG. 1 shows a conventional light control circuit for camcorders.

Codes in the drawings indicate the following: L indicates a light, T indicating a trigger circuit, Vcc a supply voltage terminal, C1-C6 capacitors, R1-R25 resistors, Vac an alternating power source, RY1 a relay, SW1-SW4 switches, Q1-Q6 transistors, OP1-OP4 amplifiers, BD1 a bridge diode, ZD1 a zenor diode, D1 a diode, PD1-PD3 photo diodes, PC photo coupler, PTR1-PTR3 photo transistors, UJT1 unijunction transistor, CDS1 an illuminance detection element, TH1 a thyristor, and TA1 a triac.

DETAILED DESCRIPTION OF THE INVENTION

In a conventional construction, as in FIG. 1, the light insulated by a photocoupler (PC) is connected serially to AC source (Vac) on one side while on the other side connected serially to resistor (R1) and capacitor (C1) and also to thrysitor (TH1), which is parallel to resistor (R1) and capacitor (C1) and whose gate (G) connecting to resistor (R2). The thyristor circuit is connected to trigger circuit (T).

On the other hand, the side including photo diode (PD1) applies voltage (Vcc) through switch (SW1) to select automatic or manual operation. A selection of automatic makes connection of (Vcc) to the emitter of transistor (Q2) and simultaneously, through resistor (R3) to the collector of transistor (Q1). The voltage from the collector of transistor (Q2) divided by resistors (R4 and R5) applies to the base of transistor (Q1), whose emitter is connected to the anode side of photo diode (PD1).

A selection of manual operation by switch (SW1) applies voltage through switch (SW2) and resistor (R12) to the anode side of photo diode (PD1). The record signal (REC) connects via resistor (R9) to the collector of transistor (Q4) and to the base of transistor (Q3) and pause signal (PAUSE) applies voltage divided by resistors (R11 and R10) to the base of transistor (Q4) whose emitter is grounded, and in turn applies voltage divided by resistors (R6 and R7) to the base and emitter of transistor (Q2).

The operation of the above circuit shall be described as follows. Referring to FIG. 1, with switch (SW1) on manual operation and switch (SW2) being open or

2

"off", the photo diode (PD1) does not conduct current so as not to actuate trigger circuit (T) such that thyristor (TH1) remains "off" and maintains the light (L) also "off". With switch (SW2) closed or "on", photo diode (PD1) conducts to activate the photo transistor (PTR1) for trigger circuit (T) to drive the gate (G) of thyristor (TH1), which turns "on" to apply current to the light (L) for its illumination. With switch (SW1) on automatic, light (L) operates on/off according to record signal (REC) and pause signal (PAUSE).

That is, when record signal (REC) is "high", the pause signal (PAUSE) is "low" for the transistor (Q4) to be non-conducting and for the transistor (Q3) to conduct causing transistor (Q2) to conduct and then transistor (Q1). Therefore, source (Vcc) applies current via resistor (R3) and transistor (Q1) to the diode (PD1) causing illumination of the light (L). (The operation of the light section shall be the same as in manual operation and thus omitted from description.)

Upon pressing the pause button in the recording state, the pause signal (PAUSE) is "high" which turns "on" transistor (Q4) and applies a "low" to the base of transistor (Q3) to turn it "off" which also turns off transistors (Q2 and Q1) cutting off photo diode (PD1) and thus thyristor (TH1) terminating the light (L).

As shown above, in the conventional art, the application of record signal (REC) turns on the light after the start of recording such that the recording proceeds initially from a dark state. Additionally, the light turns on irrespective of the brightness in the surroundings and thus waste power, and the fixed illumination irrespective of variation in the brightness of surroundings resulting in an overexposed condition for picture.

This invention is designed to overcome the above disadvantages. Referring to the drawings, the construction shall be described as follows.

Figure 2:
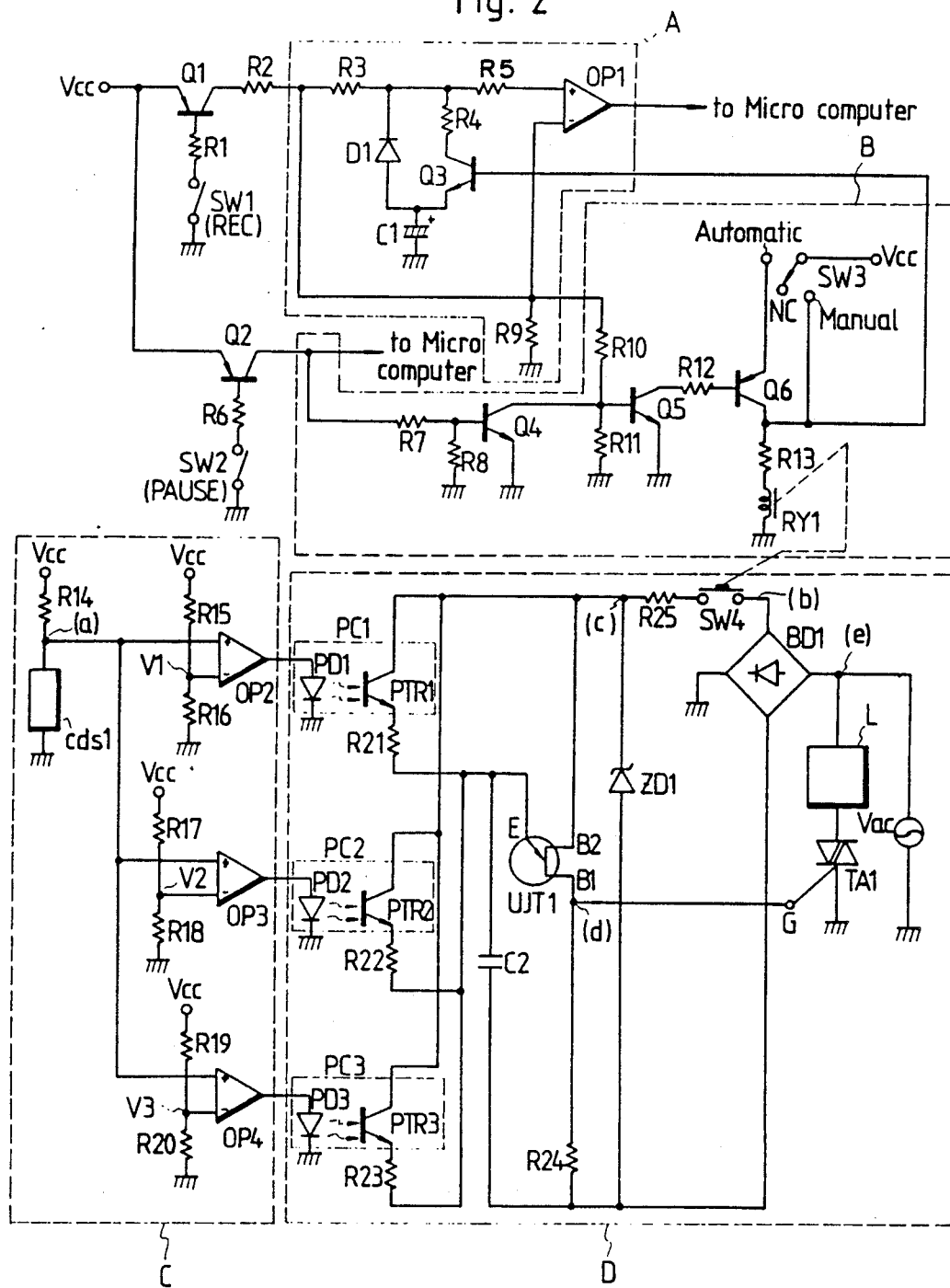
FIG. 2 shows a camcorder light control circuit according to the present invention.

FIG. 2 shows a light control circuit for camcorders according to this invention. The construction of the circuit is such that it comprises a record signal delay circuit (A) that operates according to the manipulation of record/pause switches (SW1 and SW2), ON/OFF control circuit (B) for light (L), illuminance detection circuit (C) and light control circuit (D) for adjustment of brightness. The record signal delay circuit (A) receives application of supply voltage (Vcc) by the activation of transistor (Q1) on actuation of switch (SW1). The collector of transistor (Q3) is connected via resistors (R4 and R5) to the "+" terminal of OP amplifier (OP1) and for the emitter of (Q3) is connected to the anode of diode (D1) and capacitor (C1), resistor (R3) connects the cathode of diode (D1) and to resistors (R4 and R5) with the collector of transistor (Q1) connecting via resistor (R2) to the "−" terminal of OP amplifier (OP1).

The operation of transistor (Q2) by manipulation of switch (SW2) applies source (Vcc) to the base of transistor (Q4) in the light ON/OFF control circuit (B) and the microcomputer. The collector of (Q4) and the "−" terminal of OP amplifier (OP1) connected via resistor (R10) which also is connected to the base of transistor (Q5), whose collector connecting to the base of transistor (Q6). The collector of (Q6) in turn connects to relay (RY1) via resistor (R13) and also to the base of transistor (Q3) in time delay circuit (A). Switch (SW3) connects (Vcc) in the automatic mode to the emitter of (Q6) and in the manual mode to the collector of the (Q6), and relay (RY1) operates in association with switch (SW4)

that turns on/off the direct current rectified at bridge diode (BD1) in the light control circuit (D).

Illuminance detection circuit (C) is constructed that supply voltage (Vcc) is divided between resistor (R14) and illuminance detecting element (CDS1) to be applied to the "+" terminals of OP amplifiers (OP2-OP4), whose "−" terminals are supplied with voltages from source (Vcc) divided by respective pair of resistors (R15 and R16, R17 and R18, R19 and R20) and whose outputs are arranged to drive respective photo diodes (PD1-PD3) in light control diode (D).

The luminance-following light control circuit (D) is so constructed that light (L) and triac (TA1) connect to AC supply voltage (Vac), which is rectified by bridge diode (BD1) and regulated by zener diode (ZD1) to apply to the base (B2) of unijunction photo transistors (PTR1-PTR3) in parallel connection respectively connecting to resistors (R21-R23) and between whose emitter (E) and base (B1) are connected a resistor and a capacitor (C2). The operation of the circuit shall be described in reference to the drawings.

Referring to the circuit in FIG. 2, with record switch (SW1) at "on" and switch (SW3) at automatic mode, record signal is applied via record signal delay circuit (A) to the microcomputer and also directly to the ON-/OFF control switch (SW4) to control light (L), while illuminance detection circuit (C) detects illuminance to connect through photo couplers (PC1-PC3) to light control circuit (D) to control the light according to the surrounding illuminance.

That is, with "on" of (SW1), supply voltage (Vcc) applies via transistor (Q1) and resistors (R2 and R10) to the base of transistor (Q5) to turn "on" transistors (Q5 and Q6) and drive relay (RY1). Consequently, the relay (RY1) closes switch (SW4) for operating light control circuit (D) to turn on light (L) under control of the illuminance, and transistors (Q1, Q5, Q6, Q3) conduct such that supply voltage (Vcc) charges capacitor (C1) with time constant ($\tau = R4 \times C1$) via resistor (R4) and transistor (Q3). However, when capacitor (C1) is charged above a predetermined voltage which is higher than the voltage divided by resistors (R2 and R9) and applied to the "−" terminal of OP-amp (OP1), the OP-amp (OP1) gives "high" signal output. This time-delayed record signal is applied to microcomputer to turn "on" the recorder. operation.

Meanwhile, the switching-on of pause switch (SW2) causes (Q2) to conduct and apply voltage (Vcc) to the microcomputer and to the base of (Q4) to interrupt the recording operation of the camcorder and cause (Q4) to conduct, so that transistors (Q5, Q6) are turned "off" turning (RY1) "off" and thus turning (SW4) "off" to put out the light (L).

When (SW3) is on automatic, (SW4) comes under control of switches (SW1, SW2), but when (SW3) is on manual operation, voltage (Vcc) is applied through the manual operator terminal and the collector of (Q6) and (R13) to (RY1) for its operation to maintain the "on" state of light (L1). However, when the switch (SW3) is on neutral terminal (NC), relay (RY1) stops its operation.

Once switch (SW4) is turned "on", the light control circuit (D) comes into operation to control the brightness of light. Thus, voltage (Vcc) divided by resistor (R14) and illuminance detection element (CDS1) varies according to the nature of the detector (CDS1) whose resistance decreases as illuminance becomes higher. Also, voltages (V1-V3) respectively divided by resistors (R15, R16), (R17, R18) and (R19, R20) apply to the respective "−" terminals of three OP-amps (OP-2-OP4), the voltages being in the order of $V1 < V2 < V3$.

Figure 3:
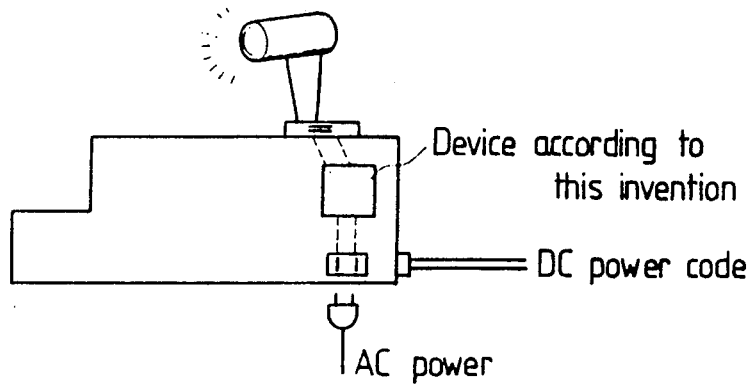
FIG. 3 shows an application to a camcorder of the light control circuit of this invention.

FIG. 3 illustrates the interrelationship of the present invention with the remaining portion of a camcorder.

Figure 4A:
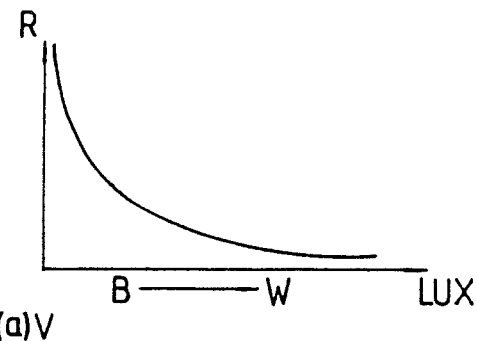
FIG. 4 shows waveforms of illuminance detection circuit in FIG. 2(C) according to the present invention.
Figure 4B:
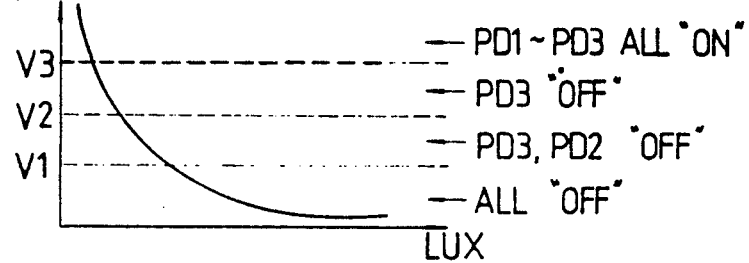

FIG. 4 (A) shows a curve indicating the characteristics of illuminance detector (CDS1). When the detector (CDS1) moves from a dark place (B) toward a brighter place (W), the resistance of (CDS1) decreases as shown in FIG. 4(A) so that the voltage applied to (CDS1) reduces to make "high" the output of OP-amps (OP-2-OP4) so as to turn "off" photo diodes (PD1-PD3) previously being "on" in reverse order from (PD3) as in FIG. 4(B) and to increase in order the parallel resistances between the base (B2) and the emitter (E) of unijunction transistor (UJT1).

Accordingly, as the parallel resistances grow, the trigger pulses in FIG. 5(d) become delayed to reduce "on-time" of triac (TA1) such that the amount of power applied to load gradually decreases.

Figure 5:
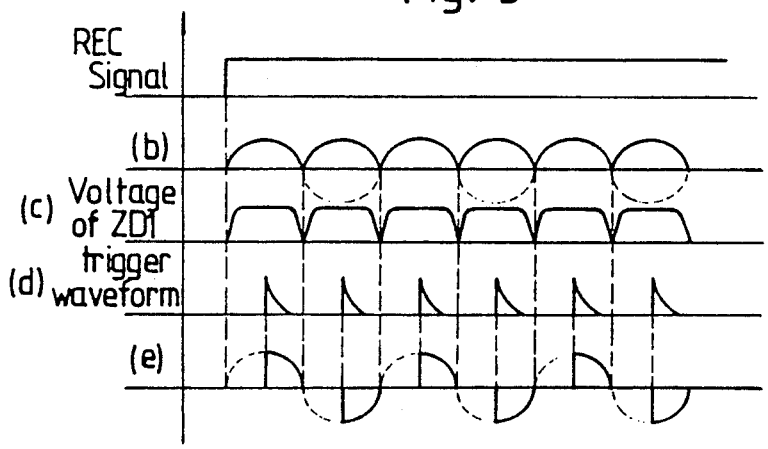
FIG. 5 shows waveforms of respective sections of the light control circuit in FIG. 2(D) by illuminances according to the invention.

FIG. 5 shows waveforms at respective parts of light control circuit (D) employing a triac (TA1). Alternating current source (Vac) is rectified by bridge diode (BD1) to form a waveform as in FIG. 5(b) and is regulated by zener diode (ZD1) to form a waveform as in (c) of FIG. 5.

The voltage in (c), that is the resultant value of parallel resistances by resistors (R21-R23) increases to make time constant (time constant ($\tau = R \times C2$) also increase so that the triggered point is also delayed to reduce the "on-time" of (TA1) and thus reduce the brightness of the light. On the contrary, if the surrounding illuminance gets darker, the light increases brightness.

Consequently, the light control circuit for camcorder of this invention automatically turns on and off according to the record and pause signals of the camcorder to thus eliminate the inconvenience of the conventional art for manually manipulating the light for its "on and off". Also, the system of the invention is that the record signal first turns on the light before proceeding to the record mode in the camcorder so as to prevent brightness applying to the recording scene and to automatically adjust the brightness of the light according to the surrounding illuminance. As described above, this invention presents an effect of photographing clean scenes irrespective of the surrounding illumination, always with no inconvenience at all.

What is claimed is:

1. A light control circuit for a video camcorder, said camcorder including a microcomputer and a subject illumination light, said light control circuit comprising:
   a pause switch for enabling a light on/off control means and applying a pause signal to said microcomputer;
   a light relay;
   a light on/off control means, responsive to said pause switch and a pause signal applied to said microcomputer, for energizing said light relay after said pause signal is applied to a microcomputer in accordance with the manipulation of said pause switch;
   a record signal delay circuit means, responsive to said on/off control means, for applying a record signal to said microcomputer after a predetermined elapsed time when said light relay of said light on/off control circuit is operated by said pause switch;

a luminance detection means, responsive to a desired subject illumination, for generating a comparison output signal in accordance with the surrounding illuminance; and a light control circuit means, enabled by said light relay and responsive to said comparison output signal, for controlling said subject illumination light of said camcorder in accordance with said light relay of the said light on/off control means.

2. A light control circuit for a camcorder according to claim 1, further including a mode selection switch for selecting an automatic mode and a manual mode, wherein said pause switch is comprised of a record-/pause switch and said light on/off control means provides said light relay energizing signal by means of driving transistors energized by said record/pause switch and said mode selection switch, and is operated in conjunction with energization of said record/pause switch when when said mode selection switch is in said automatic mode and without relation to said record-/pause switch when said mode selection switch is in said manual mode.

3. A light control circuit for a camcorder according to claim 1, wherein said record signal delay circuit means is comprised of:
   a capacitor;
   means for charging said capacitor in response to energization of said light relay;
   an operational amplifier means for providing a record signal to said microcomputer when the charge on said capacitor reaches a predetermined level.

4. A light control circuit for camcorder according to claim 1, wherein said luminance detection means comprises:
   at least one preset voltage;
   means for converting subject illumination into a voltage;
   at least one operational amplifier, said amplifier comprising a means for comparing said preset voltage with said subject illumination voltage and providing a comparison output signal indicative of said comparison.

5. A light control circuit for camcorder according to claim 1, said camcorder supplied with a source of AC power, said luminance detection means comprised of:
   an illumination detection circuit providing an output;
   at least one preset voltage source; and
   at least one comparator means, corresponding with each of said at least one preset voltage source and responsive to said illumination detection circuit output and said preset voltage source, for providing an output when said output exceeds said preset voltage.

6. A light control circuit for camcorder according to claim 5, said camcorder supplied with a source of AC power, said light control circuit means comprised of:
   at least one light emitting diode, corresponding to said at least one comparator means, for providing a light output in response to said at least one comparator means output;
   at least one photodiode, corresponding to said at least one light emitting diode, for providing an output when said light emitting diode produces an output;
   bridge diode means for rectifying said AC power and producing a rectified pulsating voltage output;
   zener diode means, responsive to said light relay, for regulating said rectified pulsating voltage output from said bridge diode means;
   a triac, coupled in series with said subject illumination light and said AC power, for controlling turning on and off of said light; and
   unijunction transistor means, responsive to said photodiode output, for providing a control signal to said triac, the control signal applied to said triac having a variable duty cycle and turning said triac on and off in conjunction with said variable duty cycle.

* * * * *